J. F. HOPPER.
BOLL COTTON GIN.
APPLICATION FILED FEB. 21, 1914.
1,099,299.
Patented June 9, 1914.
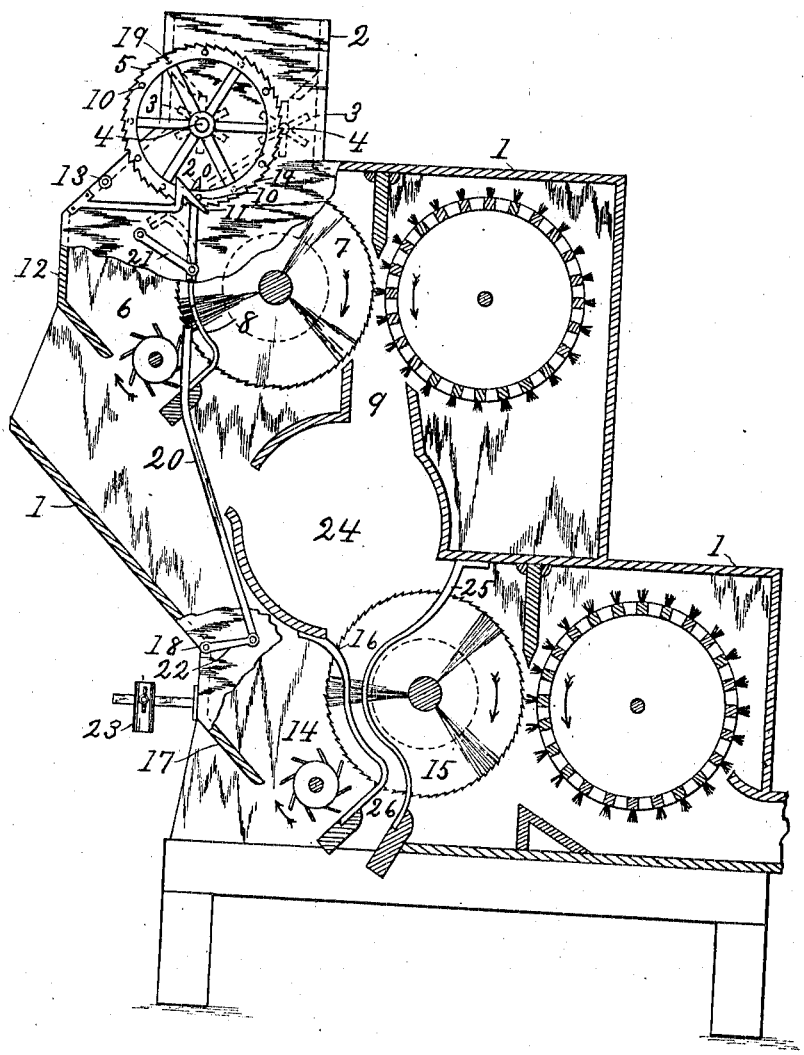
Witnesses:
Goldie Hilger.
Thos. P. Hopper.
Inventor.
James F. Hopper.
By J. P. Dederick.
Attorney

UNITED STATES PATENT OFFICE.

JAMES F. HOPPER, OF SHERMAN, TEXAS.

BOLL-COTTON GIN.

1,099,299.      Specification of Letters Patent.      Patented June 9, 1914.

Application filed February 21, 1914. Serial No. 820,286.

*To all whom it may concern:*

Be it known that I, JAMES F. HOPPER, a citizen of the United States, residing at Sherman, in the county of Grayson and State of Texas, have invented certain new and useful Improvements in Boll-Cotton Gins, of which the following is a specification.

This invention relates to a new and useful boll-cotton gin, and is designed particularly to improve the types of machines heretofore invented that embody complicated features for first crushing the bolls, then separating the seed and lint cotton therefrom.

When the weather in the fall reaches a freezing point, there is, as a general thing vast quantities of cotton in matured condition in partially opened bolls on the stalks, which at this time of the year lose their opening power on account of becoming frozen, and the cotton cannot be picked from them by hand, but may be gathered in the bolls, and with my device, without crushing or intermingling the hulls and other impurities therewith the lint may be extracted, producing a sample but little inferior to that of hand picked cotton.

A principal object of my invention is the embodiment of an apparatus with means for first separating the seed cotton from the bolls and hulls without disintegrating them, rendering the cotton thus extracted in condition to be ginned.

To this end the invention comprises a pair of saw cylinders mounted in the machine and located one above the other, the former of single rib, and the latter of the double rib type; said cylinders being normally positioned so that the bolls or hulls, after a large percentage of the seed cotton has been removed therefrom by the top cylinder, are dropped to the lower saw cylinder where the remaining seed cotton in the bolls is finally removed, passing it thence to the secondary ribs of this cylinder that completes the ginning process by separating the lint from the seeds. In order for such machines to work satisfactorily it is first necessary that the feed of the cotton into and through them should be controlled, enabling the cotton so fed to be acted upon in regulated amounts passed first to the upper and thence to the lower saw cylinder, to be acted upon by the saws.

To this end it is essential that the feeding mechanism comprise automatic means for such feeding, which is an object of my invention.

In the drawing there is disclosed a certain structure of apparatus, but in practical fields this structure may necessitate alterations, to which the patentee is entitled, provided the alterations are comprehended within the scope of what is claimed.

The invention comprises further features and combinations, as hereinafter set forth, shown in the drawing and claimed.

In the accompanying drawing, the view is a cross section of a machine constructed according to my invention, a small portion thereof being shown in elevation for better illustration.

Referring to the drawing, 1 designates the frame or casing of the machine, which is preferably of the shape shown in the drawing. Surmounting this casing is an ordinary cotton feeder 2, comprising a pair of transverse feed rolls 3 shown in dotted lines, mounted on shafts 4 and revolving toward each other; one of said shafts carrying the usual ratchet feed wheel 5 that will be referred to hereafter. The boll cotton is regularly fed by these rollers to a chamber 6, where a roll of them is formed to be acted upon by the usual single rib saw cylinder 7 that removes a great portion of the cotton from them. Between the saws of this cylinder and the ribs 8 there is sufficient space however to permit the seeds in the cotton to pass with the lint without being separated therefrom, but close enough to prevent the passage of all unbroken cotton hulls. This operation continues for predetermined intervals, the seed cotton as extracted from the bolls passing through the vertical transverse tube 9,—the increasing amount of partially cleaned hulls accumulating in the chamber 6, during this time, until one of a series of pins 10 in the feed wheel 5, engages the latch 11 secured to the breast 12, that is hinged at 13, opening the breast and dropping the accumulation of partly cleaned hulls to a lower chamber 14, where they are again acted upon in a similar manner by the double ribbed saw cylinder 15. Between the saws of this cylinder and the ribs 16 there is also space for the seeds to pass with the lint but not for the passage of the hulls, they being retained in the chamber 14, and there acted upon by the saws until all the cotton is removed, when, at regular intervals the breast 17, hinged at 18, is opened by one of a series of pins 19 in the ratchet wheel 5, contacting the upper end of the bar 20, which is connected to a knuckle 21, so positioned that a lateral movement of the bar by the pin causes the bar to descend; when the lever 22, pivoted to the bar, and secured to the breast, causes the breast to open, dropping the empty hulls from the chamber, while the downward travel of the bar causes it to escape from the pin, when the breast is again closed by the weight 23 and the operation repeated. It will be noted that we now have a continuous supply of seed cotton passing through the tube 9, and through the series of ribs 16, to the roll box 24, to be acted upon by the saw cylinder 15, and ribs 25 that are close enough to the saws to permit only the passage of lint in the usual manner, the seed passing down through the space 26 to a suitable receptacle.

Maintaining a continuous and proper roll in the chamber 24 is essential for a gin to do satisfactory work, and the embodiment herein set forth accomplishes that desideratum when ginning boll cotton, and without tearing the bolls apart, to the extent that it would place the shale or woody substance into the lint.

With other devices, where the bolls are first crushed and then ginned it is impossible to handle green or damp bolls as they cannot be broken apart, but with my method that is really an advantage as it is possible and desirable to remove the cotton without in any way disintegrating the hulls. The ratchet feed wheel 5 is provided with regularly spaced pins 10 on one side, and an equal number 19 alternately spaced upon the other side, all near its circumference, the former opening the breast 12, through the medium of an inclined latch 11, which breast, due to its manner of hinging closes by gravity. The pins 19, through the bar 20 opens the breast 17 and it is closed by the weight 23; either of said breasts always being closed when the other is opened. There are other details that could be mentioned but as they pertain mostly to ordinary cotton ginning machinery it is not deemed necessary.

What I esteem as new and desire to secure by Letters Patent, is—

In a boll-cotton gin, a pair of saw cylinders arranged one above the other and provided with the usual breasts for separating the seed cotton from the hulls, means for automatically feeding the boll cotton at regular intervals and in predetermined amounts from the upper to the lower cylinder, said feeding means comprising a rotatable ratchet wheel having alternately spaced pins on either face near its circumference, the series of pins on one side engaging a latch that opens the upper breast, and the pins on the opposite side actuating a bar that opens the lower breast for the exit of the empty hulls, as herein set forth.

In testimony whereof I affix my signature in presence of two witnesses.

JAMES F. HOPPER.

Witnesses:
GOLDIE HILYER,
THOS. P. HOPPER.